2,914,155
MAGNETIC CLUTCH TAP DRIVE

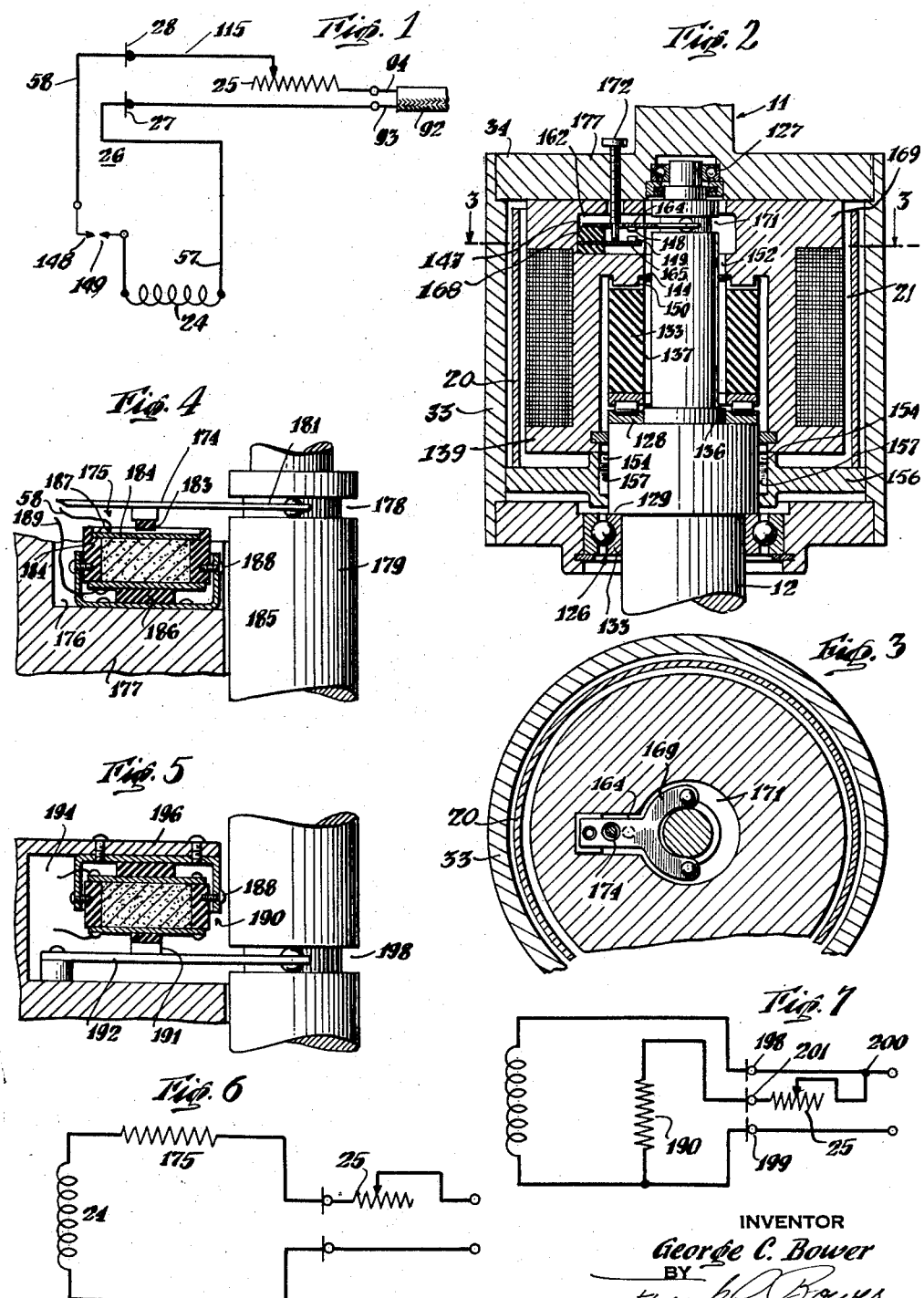

George C. Bower, Manhasset, N.Y.

Original application February 10, 1951, Serial No. 210,363, now Patent No. 2,759,580, dated August 21, 1956. Divided and this application July 19, 1956, Serial No. 598,897

2 Claims. (Cl. 192—21.5)

This invention relates to a torque transmitting device that changes to applying a minimum torque when a maximum torque is impressed.

The object of the invention is to provide a torque transmitting device that does not exceed a designated maximum torque.

Another object of the invention is to provide a torque transmitting device that reverts to a minimum torque transmitting condition on the transmission of a maximum torque.

Another object is to provide a compact torque transmitting device mountable on a tool driving machine to transmit a torque to a cutting tool up to a designated maximum torque and on exceeding the maximum torque automatically changing to apply a minimum torque.

A still further object is to provide a torque transmitting device that is readily adjusted within a range of maximum torques.

Other and further objects will appear from the following description taken in connection with the accompanying drawings in which Fig. 1 is a diagram of the electrical circuit used in connection with the embodiment in Fig. 2;

Fig. 2 illustrates a torque transmitting device responsive to axial pressure to interrupt the torque transmitting characteristic on occurrence of excessive torques;

Fig. 3 is a sectional view along lines 3—3 of Fig. 2 and shows the contact leaf spring;

Figs. 4 and 5 illustrate embodiments of pressure control devices responsive to axial pressures;

Fig. 6 is a diagram of the electrical circuit of the embodiment shown in Fig. 4; and Fig. 7 is a diagram of the electrical circuit of the embodiment shown in Fig. 5.

In Figs. 2 through 7 another embodiment of the invention is disclosed in which the shift from the maximum torque applying condition to the minimum torque applying condition occurs on the application of an excessive axial thrust. The driving member 21 and driven member 12 are axially movable in relation to each other when an excessive axial force is applied. The driven shaft 12 is mounted in the bearings 126, 127, 128. The bearings 126, 127 hold the driven member in axial alignment with the driving member. The bearing 126 holds the driven member in the driving member by the ledge 129 engaging the inner portion 133 of the bearing. The axial thrust is transmitted from the driving member 11 to the driven member 12 through the thrust bearing 128 and the rubber collar 133. The thrust bearing 128 sets on the upper shoulder 136 of the driven member 12. The rubber collar fits in the cylindrical recess 137 in the inner core 139 and engages the end surface or shoulder 144 at the upper end and the upper surface of the bearing 128 at the lower end. As the driven member pushes up, the shoulder 129 is disengaged from the inner portion 133 and the rubber is slightly compressed by the force applied by the two end surfaces. The amount of axial displacement depends on the relation of the force applied and the resiliency of the rubber. As axial thrust is applied the rubber collar 133 is compressed and the driven member telescopes into the driving member. The movement is slight but is sufficient to actuate the switch 147 and open its contacts 148, 149.

Grooves 150 are formed in the top of the rubber collar 135 into which keys 152 fit holding the rubber collar in place. The grooves 154 in the driving flange 156 are longer than the keys 157 so that the shaft 12 may move axially.

The switch 147 is fastened to the driving member. A recess portion 162 is provided in the upper end of the inner core 139. The core 139 is fastened to the end disc 34 as in the embodiment shown in Fig. 2. The recess 162 is open on the top surface of the inner core 163 and extends to the central bore of the driving member. The switch has two leaf springs 164, 165 with contacts 148, 149 and is mounted on an insulator 168. The insulator is bolted to the bottom of the recess. The upper spring 164 has a yoke 169 riding in an annular groove 171 on the driven shaft and moves up and down with the relative axial movement of the shafts disengaging and engaging the contacts 166, 167. The point of engagement is set by the adjusting bolt 172 threaded in the end disc 177 and passing through the hole 174 of the spring 164 and pressing against the lower spring 165. Under the pressure of the bolt the spring 165 is held under tension and the contact 149 moved to and from contact 166 by adjustment of the bolt 172. The bolt 172 can set the contact 149 so that the contact 148, 149 will separate on the occurrence of a given axial thrust.

The circuit connections for the embodiment are shown in Fig. 2. The switch may, however, merely break the circuit to the coils and interrupt the current flow. When the drive shaft reverses and receives the excessive axial thrust the contacts will reengage and the clutch grip to remove the tool. Under normal operating conditions current is provided by lines 94 and 93 of cable 92 through an adjustable resistor 25 and by line 115 to slip rings 28 and from line 93 to slip ring 27. Slip rings 27 and 29 are not illustrated in Fig. 2. The current is carried by lines 58 and 57 to the coil 24 with the current of line 58 passing through the contacts 148 and 149. These contacts are normally closed under proper operating conditions. However, under excessive torque the axial shift of the shaft opens the contacts 148 and 149 and disrupts the current to the coil 24.

In Figs. 4 and 5 other embodiments of a thrust pressure control are shown in which a leaf spring is moved by the driven shaft to vary the pressure applied to a pressure variable resistor controlling the energization of the coil 24. In Figs. 4 and 6 the leaf spring 174 and the variable resistor 175 are positioned in a recess 176 in the inner core 177 of the driving member. The leaf spring engages at the free end a groove 178 in the driven shaft 179. The free end comprises a yoke 181. As the shaft 179 moves axially the leaf spring is flexed and the contact 183 presses against the top of the resistor 175 varying the resistance.

The resistor 175 is cylindrical in shape and comprises two thin flexible discs 184, 185 and cylindrical insulator 186 of slightly smaller diameter than the discs. The discs are secured to the insulator by bolts 187 threaded into the insulator 186. The resistor sets on the insulating disc 186 and is held in place by the bracket 188 secured to the wall of the insulator and fastened to the bottom of the recess.

When the axial thrust pressure becomes excessive and the rubber collar 135 becomes compressed the driven shaft 179 moves up into the driving member flexing the leaf spring 174 away from the resistor 175. The pressure on the resistor will be decreased and the current flow will decrease also. The wires are connected to the discs through the bolts 187 and in series with the rheostat 25. The lowest resistance of the resistor 175 and the rheostat 25 determines the maximum transmitting torque. The highest resistance of resistor 175 and the rheostat 25 determines the minimum torque transmitted. In Fig. 4 the wire 53 is connected to the disc 184 and the disc 185 is connected by the wire 189 to the coil 24.

Instead of relieving compression on the pressure variable resistor on an increase of axial pressure it may be increased. In Figs. 5 and 7 the variable resistor 190 is compressed by the contact 191 on the leaf spring 192 and is mounted on the bottom of the recess 194. The resistor 190 is mounted on the removable top 196 by the bracket 197. The leaf spring has a yoke shaped free end that has rollers running in the groove 198. The resistor 190 and rheostat 25 are connected in series and in parallel with the coil 24. The resistors 190 and 25 shunt the coil and as their combined resistance is increased the maximum torque that may be transmitted increases and as the resistance is lowered the minimum torque is decreased. In the circuit arrangement shown in Fig. 7 three slip rings are shown. The coil 24 is connected by wires across slip rings 198, 199 and the current supplied directly to the coil. The resistor 190 and rheostat 25 are connected in series. Rheostat 25 is connected between the terminal 200 and slip ring 201. The resistor 190 is connected to slip ring 201 at one end and at the other end 203 to slip ring 199. Thus the resistor 190 and rheostat 25 by-pass the coil 24. The amount of current shunted depends on the combined resistance.

This is a division of my co-pending application, Serial No. 210,363, filed February 10, 1951, now Patent No. 2,759,580 dated August 21, 1956.

I claim:
1. A torque transmitting device comprising a driven member and a driving member, a magnetic fluid between said members, means for supplying current, a coil on one of said members energizing said fluid on passage of a current through the coil from said supply means to rigidly couple said member, a potentiometer connected in series with said coil across said supply means and controlling the value of the current through said coil, a switch shunting said potentiometer when closed to increase the current through the coil, means for actuating said switch in response to axial pressure moving said members relative to one another and opening said switch on application of an excessive axial pressure to reduce the current through the coil.

2. A torque transmitting device comprising a driven member and a driving member, a magnetic fluid between said members, a coil on one of said members energizing said fluid on passage of a current to rigidly couple said members, a variable resistor mounted on one of said members and connected in parallel across said coil, actuable means mounted on the same member as said resistor and coupling means for rotatably mounting said other member and said actuatable member to move said actuatable member in response to axial pressure connecting to one of said members, means engaging said actuatable means for varying said resistor in response to variations of axial pressure to increase the resistance as the axial pressure decreases and decrease the resistance as the axial pressure increases for maintaining the transmitted torque below a maximum.

References Cited in the file of this patent

UNITED STATES PATENTS

| 1,491,426 | Schunemann | Apr. 22, 1924 |
|-----------|------------|---------------|
| 1,555,098 | Benko | Sept. 29, 1928 |
| 2,068,260 | Biggert | Jan. 19, 1937 |
| 2,639,414 | Gould | May 19, 1953 |
| 2,661,825 | Winslow | Dec. 8, 1953 |
| 2,671,545 | Petroff | Mar. 9, 1954 |